United States Patent [19]

Matsumoto et al.

[11] Patent Number: 4,587,654
[45] Date of Patent: May 6, 1986

[54] SYSTEM FOR PROCESSING MACHINE CHECK INTERRUPTION

[75] Inventors: Toshio Matsumoto, Kawasaki; Motokazu Kato, Sagamihara, both of Japan

[73] Assignee: Fujitsu Limited, Kawasaki, Japan

[21] Appl. No.: 554,730

[22] Filed: Nov. 23, 1983

[30] Foreign Application Priority Data

Dec. 23, 1982 [JP]   Japan ................................ 57-228855

[51] Int. Cl.$^4$ ............................................. G06F 11/00
[52] U.S. Cl. ........................................ 371/14; 371/16; 364/200
[58] Field of Search ........................... 371/14, 16, 12; 364/200

[56] References Cited

U.S. PATENT DOCUMENTS

| | | | |
|---|---|---|---|
| 3,229,251 | 1/1966 | Homan et al. | 371/14 X |
| 3,555,517 | 1/1971 | Heath, Jr. et al. | 364/200 |
| 4,044,337 | 8/1977 | Hicks et al. | 364/200 |
| 4,410,938 | 10/1983 | Higashiyama | 364/200 |

Primary Examiner—Charles E. Atkinson
Attorney, Agent, or Firm—Staas & Halsey

[57] ABSTRACT

A system for processing machine check interruption using a data processor which outputs a machine check interruption signal by detecting the generation of a machine check condition and which performs interruption processing on the basis of the machine check interruption signal. The data processor includes a specific code detector which detects a specific interruption signal among the machine check interruption signals, a signal converting circuit for converting the machine check interruption signal into a modified code signal when the interruption signal generated by the machine check interruption is the above-mentioned specific code, and a control portion which assumes a disabled-waiting condition in response to the modified code signal. The operation of the data processor is stopped by placing the control portion in a disabled-waiting condition when interruption of the above-mentioned specific code occurs.

4 Claims, 2 Drawing Figures

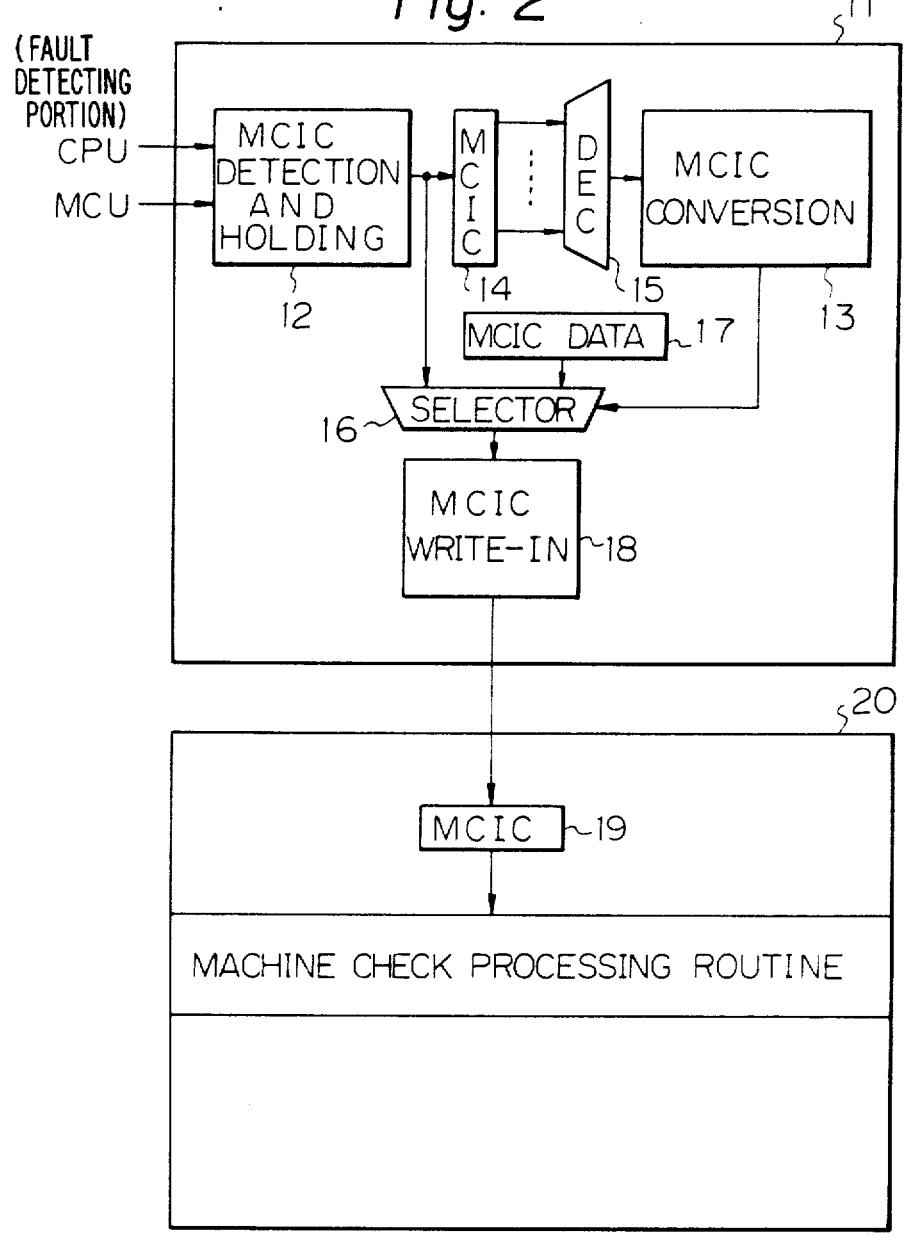

SYSTEM FOR PROCESSING MACHINE CHECK INTERRUPTION

BACKGROUND OF THE INVENTION (1) Field of the Invention

The present invention relates to a system for processing machine check interruption and more particularly to a system for processing machine check interruption using a data processor in which a machine check interruption code is analyzed when a machine check interruption occur. If the contents of the machine check interruption code show a condition in which the operation of the hardware thereafter is not guaranteed, the data processor is placed in a disabledwaiting condition.

(2) Description of the Prior Art

In a data processor, there are two main causes of machien check interruptions. One is an "exigent" condition which greatly damages the system of the data processor, and the other is a "repressible" condition which is recovered by a re-try. In an exigent condition, the central processing unit (CPU) is directly damaged, and, therefore, it becomes impossible to proceed with the execution of the instructions and with the processing of the interruption. An exigent condition is of two types: instruction processing damage (PD) and system damage (SD). An erroneous operation which cannot be discriminated as a specific kind of condition is indicated as SD. The SD includes SD occurring on a memory access route and SD occurring on a CPU route.

In a data processor, jobs are generally executed under the management of the operating system. When the jobs are executed, if the above-mentioned SD occurs, the interruption processing for the above-mentioned machine check is carried out by the software. The SD also includes damage which makes the operation of hardware unreliable, for example, damage resulting in the erroneous operation of a memory control unit (MCU) which controls the memory access operation. However, the software sometimes does not judge such damage to be in a system breakdown condition when the cause thereof is a certain kind, but executes the processing so as to interrupt, i.e., to end abnormally, only the job at that time and to move on to the next job. However, if a SD machine check error occurs in the MCU, for example, if an address parity error occurs in a main storage unit (MSU) when data is written into the MSU, the execution of subsequent jobs is not guaranteed. In this case, since the software executes some processing, it appears as if correct processing is carried out although the result of the execution is not guaranteed. Therefore, there is the danger of trouble, such as an unexpected change of the processed data, occurring.

it is desirable that the hardware immediately assume a check-stop condition when the above-mentioned erroneous operation occurs. In conventional hardware, however, since rendering the hardware to be in the check-stop mode is controlled for every type of SD in any portion, i.e., SD in the CPU, SD in the MCU, or SD in another portion. leads to the same check-stop condition. Therefore, an erroneous operation in the CPU having the SD, which usually does not lead to a system breakdown, this time does lead to a system breakdown, and the data processing is disturbed. It is also possible to design the system so that the check-stop mode is deactivated and the system breakdown condition does not occur due to a machine check interruption of the SD type. In this case, however, when SD occurs in the MCU, for example, when an address parity error is detected in the write-in operation to the main storage unit, processing is executed on the basis of erroneous data and the result obtained by processing is not guaranteed.

SUMMARY OF THE INVENTION

It is an object of the present invention to provide, in order to solve the above-mentioned problems, a system for processing machie check interruption in which the machine check interruption code is converted into another data code in accordance with the portion which assumes a machine check condition and in accordance with the content of the machine check condition, thereby causing the software to assume a disabled-waiting condition and making the data processing reliable.

According to the present invention, there is provided a system for processing machine check interruption using a data processor which outputs a machine check interruption signal by detecting the generation of a machine check condition and which performs interruption processing on the basis of the machine check interruption signal. The data processor includes a specific code detector means which detects a specific interruption signal among the machine check interruption signals, a signal converting means for converting the machine check interruption signal into a modified code signal when the interruption signal generated by the machine check interruption has the above-mentioned specific code, and a control portion which assumes a disabled-waiting condition in response to the modified code signal, the operation of the data processor being stopped by rendering the control portion to be in a disabled-waiting condition when interruption of the above-mentioned specific code occurs.

BRIEF DESCRIPTION OF THE DRAWINGS

FIG. 2 is a block circuit diagram of the structure of a signal generating portion and a control portion included in the data processor of FIG. 1.

DESCRIPTION OF THE PREFERRED EMBODIMENT

Figure 1:
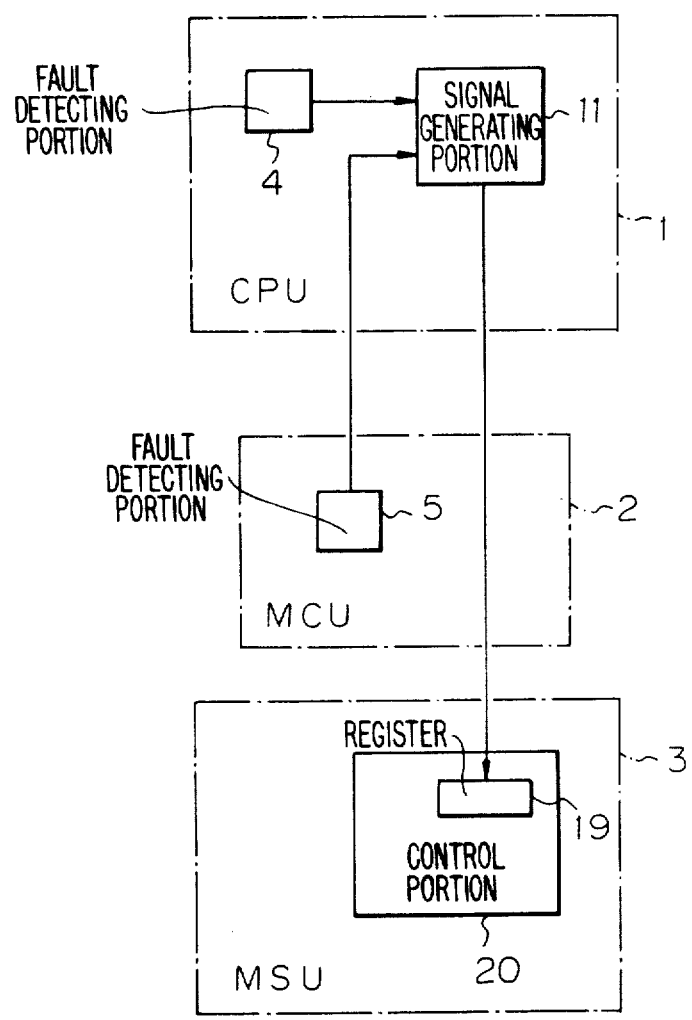
FIG. 1 is a block circuit diagram of a data processor used in a system according to an embodiment of the present invention.

The embodiment of the present invention is explained with reference to the attached drawings.

The data processor of FIG. 1 used in a system according to the present invention comprises a CPU 1, an MCU 2, and an MSU 3. The CPU 1 comprises, in addition to a general data processing portion (not shown), a signal generating portion 11, which generates a modified machine check interruption code in response to the occurrence of a machine check interruption, and a fault detecting portion 4, which generates a machine check interruption signal when a fault is detected in the CPU 1. The MCU 2 also comprises a fault detecting portion 5 generating a machine check interruption signal when a fault is detected in the MCU 2. The MSU 3 comprises a control portion 20 which includes a register 19 for storing a machine check interruption code (hereinafter referred to as an MCIC register) and a machine check processing routine.

FIG. 2 is a block diagram of the structure of the signal generating portion 11 and the control portion 20 used in the data processor of FIG. 1.

As is illustrated in FIG. 2, the signal generating portion 11 comprises a machine check detecting and holding portion 12, a control circuit 13 for converting the machine check interruption code (hereinafter referred to as an MCIC converting circuit), a code register 14, a decoder 15, a selector 16, a holding portion 17 for holding converted data of a machine check interruption code (hereinafter referred to as a MCIC conversion data portion), and a write-in portion 18 for a machine check interruption code (hereinafter referred to as an MCIC write-in portion). The control portion 20 in the MSU 3 includes, as was previously mentioned, the MCIC register 19 and the machine check processing routine.

In the signal generating portion 11, the machine check detecting and holding portion 12 detects the generation of a machine check interruption signal and holds the machine check interruption signal. The machine check interruption signal includes information on where the machine check interruption signal is generated and on the cause of the generation thereof. This information is analyzed in a debugging process so as to determine what kind of abnormal phenomenon is generated in each portion of the data processor.

The MCIC converting circuit 13 selects the output of the selector 16 so that either the output signal from the machine check detecting and holding portion 12 or the output signal from the MCIC conversion data portion 17 is output therefrom. The MCIC converting circuit 13 usually controls the selector 16 so that the machine check interruption signal sent from the machine check detecting and holding portion 12 is output from the selector 16. However, when the MCIC converting circuit 13 receives the conversion command from the decoder 15, it controls the selector 16 so that the output signal sent from the MCIC conversion data portion 17 is output therefrom.

The decoder 15 detects that the machine check interruption signal sent from the machine check detecting and holding portion 12 indicates a state in which the erroneous device and the content data of the device are in a condition in which operation of the hardware is unreliable. That is, a condition in which an address parity error is detected when data is written into a main storage unit. If the decoder 15 detects such a condition, it transmits a converting command output "1" to the MCIC converting circuit 13. The kinds of machine check interruption signals which lead to the generation of the converting command output "1" are previously determined.

The MCIC conversion data portion 17 usually outputs all "0"s and, therefore, when an all "0" signal is output from the selector 16, the machine check processing routine of the control portion 20 cannot at all analyze where the machine check interruption signal was generated or what caused it to be generated. Therefore, continuation of the execution of the machine check interruption processing becomes impossible and the data processor assumes a disabled-waiting condition.

The control portion 20 stores control programs necessary to control the various operations of the data processor and performs various control processings by executing the control programs. The control portion 20 also stores the machine check processing routine.

The operation of the system according to the present invention is explained with reference to FIGS. 1 and 2.

When a fault occurs during the execution of the data processing in a data processor and the fault detecting portion 4 or 5 outputs a machine check interruption signal, the machine check detecting and holding portion 12 detects the machine check interruption signal and temporarily memorizes it. The machine check interruption signal is then sent from the machine check detecting and holding portion 12 to the code register 14 and the selector 16. If the machine check interruption signal stored in the code register 14 shows an error in the CPU 1 by which the data processor is not led to a system breakdown state, the decoder 15 outputs an "0" signal. Therefore, the MCIC converting circuit 13 controls the selector 16 so that it outputs a machine check interruption signal. The machine check interruption signal is written into an output register (not shown) by the MCIC write-in portion 18 and is transmitted to the MCIC register 19 of the control portion 20. In the control portion 20, the place where the interruption signal is generated and the cause of the generated interruption are analyzed by the machine check processing routine on the basis of the machine check interruption signal, debugging thereby being executed.

As a result of analysis of the machine check interruption signal, if the decoder 15 judges that the machine check interruption signal is one of the signals showing a condition in which the operation of the hardware from now on is not reliable, such as the erroneous operation of the MCU, the decoder 15 outputs the conversion command output "1". In response to the conversion command output "1", the MCIC converting circuit 13 controls the selector 16 so that the selector ouputs the all "0" signal sent from the MCIC conversion data portion 17 in place of the machine check interruption signal transmitted from the machine check detecting and holding portion 12. The all "0" signal is sent to the MCIC register 19 via the MCIC write-in portion 18, and the machine check processing routine of the control portion 20 analyzes the signal stored in the MCIC register 19. However, since the content of the MCIC register 19 is all "0's" and since it is impossible to analyze the place and the cause of the generation of the fault, it is impossible for the data processor to continue processing for the machine check interruption signal. Therefore, the data processor assumes a disabled-waiting condition and stops.

According to the present invention, it is discriminated whether or not the machine check interruption signal corresponds to a condition in which operation of the hardware from now on is reliable or not. If it is discriminated that the signal corresponds to a condition in which operation of the hardware is unreliable, the hardware processing is stopped. Therefore, data processing is reliably effected.

We claim:

1. A system for processing machine check interruption, including a data processor which acts upon machine check interruption signals, the data processor detecting the generation of a machine check condition and performing interruption processing on the basis of the machine check interruption signals, said data processor comprising:

specific code detector means, operatively connected to receive the machine check interruption signals, for detecting a specific interruption signal among the machine check interruption signals;

signal converting means, operatively connected to said specific code detector means, for converting the machine check interruption signals into modified code signals when the specific interruption signal is detected by said specific code detector; and a control portion, operatively connected to said signal converting means, for assuming a disabled-waiting condition in response to the modified code signals, the operation of said data processor being stopped by placing said control portion in the disabled-waiting condition.

2. A system according to claim 1, wherein said data processor comprises a memory control unit having a signal generating portion, and wherein the specific interruption signal is generated when the machine check condition is detected by the signal generating portion of said memory control unit.

3. A system according to claim 1, wherein said modified code signals comprise an all "0" code.

4. A method for processing machine check interruption under the control of a data processor which detects the generation of a machine check condition and then performs interruption processing in accordance with the machine check interruption signals, the data processor including a central processing unit, a memory control unit which outputs machine check interruption signals and a main storage unit, said method comprising the steps of:

(a) detecting a fault in the central processing unit and the memory control unit and generating respective machine check interruption signals;

(b) generating, in the central processing unit, a modified machine check interruption code in response to the machine check interruption signals generated in step (a);

(c) storing the modified machine check interruption code and a machine check processing routine in the control portion in the main storage unit and issuing a disabled-waiting condition in accordance with the modified machine check interruption code.

* * * * *

UNITED STATES PATENT AND TRADEMARK OFFICE
CERTIFICATE OF CORRECTION

PATENT NO. : 4,587,654

DATED : MAY 6, 1986

INVENTOR(S) : TOSHIO MATSUMOTO ET AL.

It is certified that error appears in the above-identified patent and that said Letters Patent is hereby corrected as shown below:

Col. 1, line 15, "disabledwaiting" should be --disabled-waiting--;
      line 19, "machien" should be --machine--;
      line 60, "portion." should be --portion, the--.

Col. 2, line 10, "machie" should be --machine--.

Signed and Sealed this

Fifteenth Day of July 1986

[SEAL]

Attest:

DONALD J. QUIGG

Attesting Officer

Commissioner of Patents and Trademarks